United States Patent [19]

Thomas

[11] 4,102,706

[45] Jul. 25, 1978

[54] REMOVING IRIDESCENT STAINS FROM VITREOUS SURFACES

[75] Inventor: Lazarus D. Thomas, Maumee, Ohio

[73] Assignee: Libbey-Owens-Ford Company, Toledo, Ohio

[21] Appl. No.: 777,897

[22] Filed: Mar. 16, 1977

[51] Int. Cl.$^2$ .................... B08B 3/08; C03C 23/00
[52] U.S. Cl. .......................... 134/3; 65/31; 134/28; 252/79.3; 252/DIG. 10
[58] Field of Search ............ 134/3, 28; 252/79.3, 252/DIG. 10; 156/663; 65/31

[56] References Cited

U.S. PATENT DOCUMENTS

| | | | |
|---|---|---|---|
| 37,975 | 3/1863 | Pohle et al. | 65/31 UX |
| 77,834 | 5/1868 | Parrott et al. | 134/3 |
| 1,529,239 | 3/1925 | Callard | 65/31 X |
| 2,366,825 | 1/1945 | Adams | 65/31 |
| 3,130,098 | 4/1964 | Levengood | 156/663 X |
| 3,171,768 | 3/1965 | Levengood | 65/31 X |
| 3,310,495 | 3/1967 | Masuda et al. | 252/79.3 X |
| 3,753,840 | 8/1973 | Plumat | 65/31 X |

OTHER PUBLICATIONS

*Hackh's Chem. Dictionary*, "Hydrochloric Acid, Concentrated–", 4th Ed., 1969, p. 331.

*Primary Examiner*—S. Leon Bashore
*Assistant Examiner*—Marc L. Caroff
*Attorney, Agent, or Firm*—Collins, Oberlin & Darr

[57] ABSTRACT

Iridescent stains are removed from vitreous surfaces by contacting the surfaces with an aqueous solution of hydrochloric acid and sodium fluoride followed by rinsing the solution from the surfaces with water and, optionally, buffing the surfaces with an aqueous mixture of cerium oxide. The method provides benefits not only in cleaning efficiency but also in operational safety to personnel and absence of detrimental effects on surrounding building materials.

4 Claims, No Drawings

REMOVING IRIDESCENT STAINS FROM VITREOUS SURFACES

This invention relates generally to a method of cleaning vitreous surfaces and, more particularly, to a method of removing stains from glass glazing units.

While it is an infrequent occurrence, there are cases where finished glass windows have an iridescent stain. This stain often does not show up until the glass pane has been installed or glazed in a building. Since the replacement of such windows is of course very expensive, it would be extremely beneficial to find an inexpensive, harmless, fast and relatively easy method of removing the stain.

It has now been discovered, and the present invention is based upon such discovery, that glass that exhibits an iridescent stain can be successfully cleaned by contacting the stained surface with an aqueous solution of concentrated hydrochloric acid and sodium fluoride.

It is, accordingly, an object of the present invention to provide a method of cleaning and thus reclaiming a vitreous glazing unit from a defective stained unit.

A further object of the invention is to provide a method of removing iridescent stain from an installed glass glazing unit quickly and with a minimum of risk to personnel and to surrounding metalwork.

In order to achieve the above objects, the invention provides a method which includes contacting a stained glass surface with a solution consisting essentially of the following ingredients in the indicated proportions: 2.5 to 7.5 grams of sodium fluoride, 2.5 to 7.5 milliliters of concentrated hydrochloric acid, and 250 milliliters of water, maintain such contact for at least 30 seconds, and thereafter rinsing the surface free of the solution with water.

It sometimes happens that after the above-described cleaning step some whitish stains will be noticed on the glass surface. These stains are removed by hand buffing with cerium oxide, generally employing a solution of 150 to 250 grams of cerium oxide per liter of water.

The cleaning composition for use in accordance with the invention is preferably prepared by first adding the hydrochloric acid to the desired quantity of water and then adding the sodium fluoride to the dilute acid mixture. While it is preferable to mix only the amount of cleaning solution that can be used in one day, the composition in fact has a shelf life of several weeks.

Best results are obtained if the cleaning composition is at approximately room temperature, e.g., 20° C. to 25° C., when employed, and the glass surface to be treated thoroughly washed to remove all surface dirt therefrom. In this respect, it is beneficial to have a supply of running water available at all times during the cleaning procedure.

A cellulose sponge is advantageously employed to apply the cleaning solution to the glazing unit and may be dipped into the solution and then slightly squeezed so that it holds as much liquid as possible without dripping excessively. The sponge is wiped onto the glass surface with as much area of the glass being covered as can conveniently be kept wet for the desired contact time, i.e., 30 seconds to 4 minutes. After application of the cleaning solution, the glass is rinsed with water.

If the glazing unit is of such a large size that it is not possible to clean with one application of solution, it is best to rinse with water and then squeegee of the rinse water before starting another section. It will normally not matter if there is some overlapping of cleaning solution from one section to another. In other words, if for example one to three minutes are needed to remove the stain, generally no harm will be done if the cleaning solution stays on the glass for five minutes. Also, if some staining remains in the treated area, the application of the solution and the cleaning procedure may be repeated on the stained spots for an additional period of time.

In the event some whitish stains remain after the above-described cleaning procedure, these can be removed by hand buffing with cerium oxide.

The buffing mixture can be prepared at any time and can be stored in glass or plastic containers indefinitely. The mixture generally comprises 150 to 250 grams of cerium oxide per liter of water with the preferred composition consisting of 200 grams of cerium oxide per liter. A wool felt pad is advantageously used to apply the buffing compound and can be conveniently soaked in the buffing mixture for some time before use.

To clean the glass, some cerium oxide is picked up on the bottom surface of the pad. Time should be allowed for excess water to drain off and the cerium oxide then applied to the stain with a rubbing action including the application of some pressure. If the cerium oxide totally dries, more should be applied. A slightly moist, creamy appearing cerium oxide is best for the buffing procedure. In general, one minute of buffing should be sufficient to remove most stains. As previously mentioned, this buffing procedure should be used only where there are whitish or iridescent stains remaining on the glass that were not removed by the previous cleaning step, a situation which does not occur in the great majority of instances.

After buffing, the cerium oxide is removed from the glazing unit by use of a water spray. It may be necessary to wipe the glass with a clean sponge or rag to remove all traces of the cerium oxide.

EXAMPLE

A cleaning solution for use in accordance with the invention was prepared by putting 4 liters of water in a plastic pail and adding 80 milliliters of concentrated (36.5–38%) hydrochloric acid thereto. This solution was stirred thoroughly and then 80 grams of sodium fluoride was added to the acid-water solution. After stirring the resulting mixture for approximately two minutes, all of the sodium fluoride was dissolved and the solution ready for use.

Two glass sheets were provided, one of which was a heat absorbing bronze colored glass as is commonly employed in glazing buildings, and the other a clear plate glass sheet. The bronze glass had an iridescent hazy streak running diagonally across the sheet while the clear glass glazing contained a heavy mottling of haze over the entire glass surface. Both sheets were washed free of surface dirt with water and dried. The cleaning solution, which was at room temperature (23° C.), was first sponged on the bronze glass streak with the area being kept wet with solution for one minute. The treated area was then hosed down with water and inspection showed the iridescent stain to be removed and that no damage to the glass had taken place.

The cleaning solution was then sponged over the entire surface of the clear glass sheet and again the sheet surface kept wet with solution for one minute. Inspection showed the iridescent haze to be removed and no damage to the sheet.

It has been found that with the use of a solution of the strength employed above, it is best that removal thereof from the glass sheet be effected before approximately five minutes. After this time it is possible to lightly frost the glass suface.

Glass sheets with varying amounts or iridescent stain were treated in the above-described manner with solutions comprising 30 grams of sodium fluoride and 30 milliliters of concentrated (36.5–38%) hydrochloric acid per liter of water, and 10 grams of sodium fluoride and 10 milliliters of concentrated (36.5–38%) hydrochloric acid per liter of water. The more highly concentrated solution removed the stains in about 30 seconds while the lower concentration solution required from about two to three and one-half half minutes to remove the iridescent stain. Care had to be employed in the use of the more concentrated solution in that the tendency for the solution to frost the glass surface was much greater than with solutions slightly less concentrated. Increasing or lowering the solution temperature moderately had a relatively slight effect on the reaction rate of the solutions.

On one glass sheet, after employing a 20 gram sodium fluoride-20 milliliter concentrated (36.5–38%) hydrochloric acid-1 liter water solution for two minutes, not all of the iridescent stain originally present on the sheet was gone. Reapplication of the solution for one minute removed essentially all of the remaining iridescent stain, but in one area a whitish haze was left. This haze was removed by buffing with a wool felt pad impregnated with a pasty composition of 200 grams of cerium oxide in 1 liter of water.

It is to be understood that the forms of the invention herewith described are to be taken as illustrative embodiments only of the same, and that various procedural changes may be resorted to without departing from the spirit of the invention.

I claim:

1. A method of removing iridescent stain from glass surfaces comprising contacting said surfaces with a solution consisting essentially of the following components in the indicated proportions: 2.5 to 7.5 grams of sodium fluoride, 2.5 to 7.5 milliliters of concentrated hydrochloric acid, and 250 milliliters of water; maintaining said contact for at least 30 seconds; and thereafter rinsing said solution from said surface with water.

2. A method of cleaning stained glass surfaces as claimed in claim 1, wherein said solution is in contact with said surfaces for a period of time between two and four minutes.

3. A method of removing iridescent stain from surfaces of a glass glazing unit, comprising contacting said surfaces with an aqueous solution consisting essentially of the following ingredients in the indicated proportions: 1 liter of water, 20 grams of sodium fluoride, 20 cc of concentrated hydrochloric acid, maintaining said contact of said solution for a period of time of from two minutes to four minutes, and thereafter rinsing the said solution from said surfaces with water.

4. A method of removing iridescent stain from the surface of a glass window, including contacting said surface with an aqueous solution consisting essentially of from 2.5 to 7.5 grams of sodium fluoride, 2.5 to 7.5 milliliters of concentrated hydrochloric acid, and 250 milliliters of water, maintaining said contact for at least 30 seconds, rinsing said surface free of said solution with water, preparing a mixture comprising 150 to 250 grams of cerium oxide per liter of water, applying said mixture to any areas of said glass surface containing stains not removed by said solution, buffing said areas with said mixture until such stain is removed, and thereafter rinsing said mixture from said surfaces with water.

* * * * *